(12) United States Patent
Gruber et al.

(10) Patent No.: US 11,604,252 B2
(45) Date of Patent: Mar. 14, 2023

(54) RADAR TARGET EMULATOR HAVING A SUPERIMPOSITION APPARATUS AND METHOD FOR SUPERIMPOSING SIGNALS

(71) Applicant: AVL LIST GMBH, Graz (AT)

(72) Inventors: Andreas Gruber, Graz (AT); Michael Ernst Gadringer, Graz (AT); Helmut Schreiber, Graz (AT)

(73) Assignee: AVL List GmbH, Graz (AT)

( * ) Notice: Subject to any disclaimer, the term of this patent is extended or adjusted under 35 U.S.C. 154(b) by 444 days.

(21) Appl. No.: 16/474,787

(22) PCT Filed: Dec. 28, 2017

(86) PCT No.: PCT/EP2017/084684
§ 371 (c)(1),
(2) Date: Sep. 16, 2019

(87) PCT Pub. No.: WO2018/122285
PCT Pub. Date: Jul. 5, 2018

(65) Prior Publication Data
US 2019/0391234 A1    Dec. 26, 2019

(30) Foreign Application Priority Data

Dec. 29, 2016 (AT) .............................. A 51189/2016

(51) Int. Cl.
*G01S 7/40* (2006.01)
*G01S 13/931* (2020.01)

(52) U.S. Cl.
CPC ........... *G01S 7/4052* (2013.01); *G01S 7/4065* (2021.05); *G01S 13/931* (2013.01)

(58) Field of Classification Search
CPC ..... G01S 7/4052; G01S 7/4065; G01S 13/931
See application file for complete search history.

(56) References Cited

U.S. PATENT DOCUMENTS 3,002,188 A    9/1961 Abbott et al.
3,903,521 A    9/1975 Jensen et al.
(Continued)

FOREIGN PATENT DOCUMENTS

| CN | 103809163 | 5/2014 |
| CN | 104391283 | 3/2015 |

(Continued)

OTHER PUBLICATIONS https://en.wikipedia.org/wiki/Potentiometer accessed on May 20, 2022 as definition of attenuator (Year: 2022).*
(Continued)

*Primary Examiner* — Donald H B Braswell
(74) *Attorney, Agent, or Firm* — Sheridan Ross P.C.

(57) ABSTRACT

A radar target emulator with a superimposition apparatus, having a first input provided to receive a first signal, a second input provided to receive a second signal, a first attenuation device that is connected to the first input in signal-carrying fashion and configured to attenuate the first signal, in particular to a predetermined extent, and to provide a first attenuated signal, a second attenuation device that is connected to the second input in signal-carrying fashion and configured to attenuate the second signal, in particular to a predetermined extent, and to provide a second attenuated signal, an addition device that is configured to add the first attenuated signal and the second attenuated signal and to output a corresponding output signal.

15 Claims, 3 Drawing Sheets

(56) References Cited

U.S. PATENT DOCUMENTS

| | | | |
|---|---|---|---|
| 4,316,159 A | 2/1982 | Ho | |
| 4,660,041 A | 4/1987 | Maples et al. | |
| 5,247,843 A | 9/1993 | Bryan | |
| 5,339,087 A | 8/1994 | Minarik | |
| 5,518,400 A | 5/1996 | Otiode et al. | |
| 5,862,455 A * | 1/1999 | Martin | H04B 17/0085 455/305 |
| 5,892,479 A | 4/1999 | Mills et al. | |
| 6,191,735 B1 * | 2/2001 | Schineller | H01P 1/185 333/164 |
| 6,346,909 B1 | 2/2002 | Johnson et al. | |
| 6,624,780 B1 * | 9/2003 | Fouts | G01S 7/021 342/25 R |
| 6,989,788 B2 | 1/2006 | Marion et al. | |
| 8,248,297 B1 | 8/2012 | Baker et al. | |
| 2003/0222693 A1 | 12/2003 | Cohen et al. | |
| 2004/0012517 A1 | 1/2004 | Abou-Jaoude et al. | |
| 2004/0201518 A1 | 10/2004 | Pace et al. | |
| 2007/0285315 A1 | 12/2007 | Davis et al. | |
| 2009/0125013 A1 * | 5/2009 | Sypniewski | A61B 18/1815 606/33 |
| 2009/0174499 A1 * | 7/2009 | Hiramatsu | H01P 1/18 333/167 |
| 2009/0309783 A1 | 12/2009 | Shih et al. | |
| 2010/0109940 A1 | 5/2010 | Williams | |
| 2014/0197983 A1 | 7/2014 | Reuter | |
| 2015/0350223 A1 | 12/2015 | Spivack | |
| 2016/0245900 A1 | 8/2016 | Hurtarte et al. | |
| 2017/0115378 A1 | 4/2017 | Haghighi et al. | |
| 2017/0132334 A1 | 5/2017 | Levinson et al. | |
| 2017/0307732 A1 * | 10/2017 | Haghighi | G01S 7/4056 |
| 2018/0019755 A1 | 1/2018 | Josefsberg et al. | |
| 2020/0025875 A1 | 1/2020 | Maier | |

FOREIGN PATENT DOCUMENTS

| | | | |
|---|---|---|---|
| CN | 105510980 | 4/2016 | |
| CN | 106802593 | 6/2017 | |
| DE | 2523288 | 12/1976 | |
| DE | 3888993 | 10/1994 | |
| DE | 69221121 | 3/1998 | |
| DE | 102007002370 | 7/2008 | |
| DE | 112012004728 | 7/2014 | |
| DE | 102014017831 | 6/2016 | |
| DE | 102014118622 | 6/2016 | |
| DE | 102014118625 | 6/2016 | |
| DE | 102015121297 | 3/2017 | |
| EP | 0061559 | 10/1982 | |
| EP | 1341000 | 9/2003 | |
| GB | 2444161 | 5/2008 | |
| JP | S60-223303 | 11/1985 | |
| JP | H04-212083 | 8/1992 | |
| JP | H07-280924 | 10/1995 | |
| JP | H09-230029 | 9/1997 | |
| JP | H09-270772 | 10/1997 | |
| JP | H10-221429 | 8/1998 | |
| JP | 2001-524676 | 12/2001 | |
| JP | 2003-149324 | 5/2003 | |
| JP | 3928837 | 6/2007 | |
| JP | 2010-159998 | 7/2010 | |
| KR | 10-2016-0050121 | 5/2016 | |
| WO | WO 99/08129 | 2/1999 | |
| WO | WO 2011/008146 | 1/2011 | |
| WO | WO-2011008146 A1 * | 1/2011 | G01S 7/023 |
| WO | WO 2016/025683 | 2/2016 | |

OTHER PUBLICATIONS

Official Action for Austria Patent Application No. A 51189/2016, dated Jul. 31, 2017, 3 pages.

International Search Report for International (PCT) Patent Application No. PCT/EP2017/084684, dated Mar. 28, 2018, 3 pages.

U.S. Appl. No. 16/474,799, filed Jun. 28, 2019, Gruber et al.

U.S. Appl. No. 16/753,848, filed Apr. 6, 2020, Gruber et al.

U.S. Appl. No. 16/753,866, filed Apr. 6, 2020, Gadringer et al.

Mcmillian et al. "A 500 MHz GaAs digital RF memory modulator IC," Gallium Arsenide Integrated Circuit (GAAS IC) Symposium, 1996, Technic AL Digest 1996, 18th Annual Orlando, Fl. USA, Nov. 3-6, 1996, IEEE, pp. 73-76.

Vorderderfler et al. "Frequency dividers in radar target stimulator applications," Elektrotechnik & Informationstechnik, 2018, vol. 135, No. 4-5, pp. 344-351.

Mukti et al. "A preliminary result on development of analog broadband tapped delay line for L-band applications," International Seminar on Intelligent Technology and Its Applications (ISITIA), Lombok, Indonesia, Jul. 2016, pp. 357-362 (Abstract only).

English Translation of International Preliminary Report on Patentability for International (PCT) Patent Application No. PCT/EP2017/084684, dated Jul. 11, 2019, 8 pages.

Duan et al. "Finite-time Boundedness and l1-gain Analysis for Discrete Positive Switched Systems with Time-varying Delay," Proceedings of the 32nd Chinese Control Conference, Jul. 26-28, 2013, Xi'an, China, pp. 2090-2095.

* cited by examiner

RADAR TARGET EMULATOR HAVING A SUPERIMPOSITION APPARATUS AND METHOD FOR SUPERIMPOSING SIGNALS

CROSS REFERENCE TO RELATED APPLICATIONS

This application is a national stage application under 35 U.S.C. 371 and claims the benefit of PCT Application No. PCT/EP2017/084684 having an international filing date of 28 Dec. 2017, which designated the United States, which PCT application claimed the benefit of Austria Patent Application No. A 51189/2016 filed 29 Dec. 2016, the disclosures of each of which are incorporated herein by reference in their entireties.

The present invention relates to a radar target emulator having a superimposition apparatus.

The complexity of mobile systems, in particular of land-based motor vehicles such as, for example, passenger cars, trucks or motorcycles, has been steadily increasing for years. Alongside reducing emissions and/or fuel consumption or increasing driving comfort, this is also occurring to facilitate the management of steadily increasing traffic in urban areas and the associated increased complexity of different driving situations. This is generally the purview of driver assistance systems which support the driver in standard and/or extreme situations in the form of information and/or actively intervening in the vehicle behavior based on vehicle-internal sensors and/or communication with other vehicles and/or with stationary points and/or services relative to the vehicle environment, in particular the prospective route.

Radar sensors are frequently used at least as one component of the above-cited sensor technology, these monitoring the direct surroundings of the vehicle relative to obstacles and/or preceding vehicles or the like. Known with respect to the evaluating of such assistance systems is supplying these sensors with information about a test scenario, in particular a virtual test scenario, and evaluating the response of the assistance system.

A programmable fiber optic delay line and a radar target simulation system equipped with same is known from DE 692 21 121 T2. A special delay line form is disclosed, wherein each delay line contains a plurality of fiber optic segments having predetermined optical delays as well as a switching scheme in order to only connect together into an aggregate delay line those segments which together result in the desired delay. In one exemplary embodiment, different segments have different lengths relative each other as well as correspondingly different delay periods and are arranged in a binary progression. The selected segments are switched into the aggregate delay line, whereby optical bypasses are switched into the aggregate delay line for the undesired segments. The disclosed system thereby preferentially comprises two such delay lines, wherein during operation, the first delay line of a suitable length is activated; i.e. transmits the signal, while the second delay line is inactive. The next required length is set at this second delay line and then switching occurs from the first to the second line so as to be able to thereby prevent larger phase jumps.

In light of the above, it is a task of the present invention to specify a radar target emulator having a superimposition apparatus or respectively a method for superimposing signals which improves upon the prior art.

This task is solved in the sense of the present invention by a radar target emulator having a superimposition apparatus in accordance with claim 1 and a method for superimposing signals according to claim 7.

A first aspect of the present invention relates to a radar target emulator having a superimposition apparatus, wherein the superimposition apparatus comprises: a first input provided to receive a first signal; a second input provided to receive a second signal; a first attenuation device connected to the first input in signal-carrying fashion and configured to attenuate the first signal, in particular to a predetermined extent, and provide a first attenuated signal; a second attenuation device connected to the second input in signal-carrying fashion and configured to attenuate the second signal, in particular to a predetermined extent, and provide a second attenuated signal; and an addition device configured to add the first attenuated signal and the second attenuated signal and output a corresponding output signal.

This is in particular advantageous since movement of an object is not thereby emulated by an abrupt advance into the next distance segment but rather is configured from preferably adjacent distance segments of virtually any intermediate position with the help of attenuation devices in order to thereby replicate at least substantially continuous movement without significant high-frequency signal phase jumps.

Figure 1:
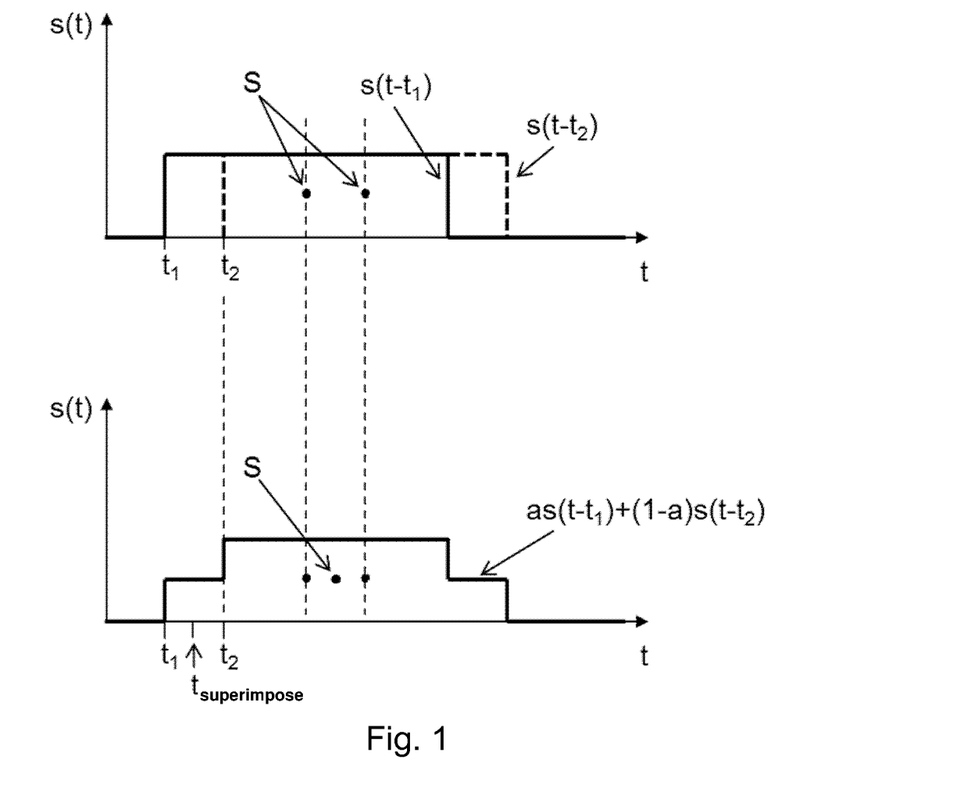
FIG. 1 one example of a superimposition of two signals.

The present invention is based on the realization that superimposing two delay signals of different lengths produces a signal exhibiting a "center of mass" delay corresponding to the amplitude weighted average of the original delays. This correlation is depicted in FIG. 1 by the time-shifted signals $s(t-t_1)$ and $s(t-t_2)$. The "center of mass" of the linear combination of these time-shifted signals $as(t-t_1)+(1-a)s(t-t_2)$ can now be shifted between $t_1$ and $t_2$ by the appropriate selection of parameter a.

Preferably, it is in this way possible to approximate simulation of each intermediate delay. The behavior is further improved in the case of an FMCW radar sensor (or continuous wave radar sensor respectively) since both signals have different but close frequencies because of the different delays. When these signals are superimposed, a so-called beating is produced; i.e. an amplitude-modulated oscillation. According to one implementation of the present invention, the frequency of this oscillation corresponds to the weighted average of the two original frequencies. Preferably at least substantially every frequency in a required distance interval can thereby be reproduced and thus every delay between zero and the maximum value.

A "radar target emulator" in the sense of the present invention is in particular a device for stimulating a sensor, in particular a vehicle, which in particular receives a radar signal of the sensor, modulates it and returns it to the sensor, wherein the test scenario is imaged during modulation in order to determine and evaluate the response of a control unit in this, in particular virtual, test scenario.

A "superimposition apparatus" in the sense of the present invention is in particular an apparatus which is provided, in particular configured, to modify an output signal which, in a first state, is based on the first signal, in particular substantially continuously, such that the output signal in a second state is at least substantially based on the second signal.

A "signal" in the sense of the present invention is in particular a high-frequency signal, in particular a radar signal.

An "attenuation device" in the sense of the present invention is in particular a device which is provided, in particular configured, to modify, in particular attenuate, an input signal, in particular to a predetermined extent, and provide a correspondingly modified signal. According to one implementation, the attenuation device in the sense of the present invention can also be designed as an attenuation and/or amplification device, meaning that pursuant to one implementation, the amplifying of an input signal by an attenuation device is also explicitly included in the protective scope in the sense of the present invention.

An "addition device" in the sense of the present invention is in particular an electrically passive component in the field of high-frequency technology which serves to couple electromagnetic power described as a guided wave into a conductive structure. According to one embodiment, adders in the sense of the present invention exhibit a bridge circuit comprising transformers and capacitors or a line coupler, for example on electrical circuit boards as strip lines, or a combination of waveguides. Addition devices in the sense of the present invention can however also be actively realized, for example by using a summing circuit with broadband operational amplifiers.

According to one implementation of the present invention, the first and the second attenuation device are at least substantially independently adjustable. This is particularly advantageous since doing so thereby enables advantageous flexibility in the control of the radar target emulator.

According to a further implementation of the present invention, the first attenuation device and/or the second attenuation device is an adjustable attenuation device, in particular variably and/or incrementally, particularly an at least substantially continuous and/or dynamically adjustable attenuation device. This is particularly advantageous as the above-noted phase jumps can thereby be reduced in the output signal, in particular prevented, which results in advantageously realistic imaging of the test scenario from the perspective of the system to be evaluated.

According to a further implementation of the present invention, the addition device comprises a superimposition adder.

According to a further implementation of the present invention, the radar target emulator further comprises a third input which is configured to receive a third signal, and a third attenuation device connected to the third input in a signal-carrying fashion and configured to attenuate the third signal, in particular to a predetermined extent, and provide a third attenuated signal, wherein the addition device is configured to add the first attenuated signal, the second attenuated signal and the third attenuated signal and output a corresponding output signal.

According to one embodiment, the first, the second and the third signal are formed by source signals having differing delays. Said delay corresponds to an emulated object's emulated distance to the radar detector. When an object moving toward the vehicle or, respectively, the distance between vehicle and object reducing, is to be emulated, the first signal and the second signal are then to be determined such that the distance to be emulated lies between the respectively depicted distance. As is described below with respect to the method, the distance to be emulated is set by controlling the corresponding attenuation devices from the two signals with varying weighting factors until the distance to be emulated corresponds at least substantially to one of the two signals. In order to also be able to generate a distance imaging at least substantially without significant phase jump, the third input described here is provided with the third attenuation device. Selected and applied to the third input as the third signal is a signal which, according to the emulated direction of movement (i.e. toward or away from the sensor) together with one of the two above-mentioned signals, forms the required distance interval, in particular the next required distance interval. By means of the third attenuation device, the emulating of the direction of movement of the object to be emulated can continue at least substantially continuously. This is in particular advantageous since by doing so, the imaging accuracy of the test scenario is further improved.

According to a further implementation of the present invention, the first signal and the second signal, and in particular also the third signal, stem from a common source signal and differ from each other in particular in terms of at least one property, in particular a time delay. As described here, according to one implementation, a radar signal emitted by an actual sensor, for example a vehicle to be evaluated, is received, delayed and provided for further modulation in the course of imaging a virtual test scenario. According to one implementation of the present invention, the three signals differ at least substantially exclusively in terms of their time delay, which serves in the further course of emulating different objects at different distances to the sensor. This is in particular advantageous since by doing so, multiple signals do not need to be artificially generated and supplied to the vehicle sensor but rather the signal generated by the sensor itself can be used as the source signal, which in turn is closer to reality and therefore contributes to good imaging accuracy of the test scenario.

According to a further implementation of the present invention, the degree of attenuation of the first attenuation device and/or the degree of attenuation of the second attenuation device, in particular and/or the degree of attenuation of the third attenuation device, is set and/or varied between a lower extreme value and an upper extreme value, in particular whereby the upper extreme value of an attenuation corresponds at least substantially to 100% and/or the lower extreme value of an attenuation corresponds at least substantially to 0%. In other words: With an attenuation of at least substantially 100%, the respectively applied input signal is at least substantially completely suppressed whereas the respectively applied input signal at an attenuation of at least substantially 0% is relayed at least substantially unchanged. This is particularly advantageous as the occurrence of phase jumps is in this way likewise at least reduced, in particular at least substantially prevented.

A further aspect of the present invention relates to a method for superimposing signals, in particular by means of a radar target emulator of the type described herein, which comprises the steps:

S1 applying a first signal to a first attenuation device and a second signal to a second attenuation device;

S2 attenuating the first signal and the second signal, in particular to different degrees of attenuation, by means of the first and second attenuation devices, wherein the degree of attenuation of the first attenuation device and/or the second attenuation device can be set and/or varied, in particular dynamically and/or incrementally, in particular at least substantially continuously;

S3 providing a first attenuated signal and a second attenuated signal;

S4 adding the first attenuated signal and the second attenuated signal such that the output signal exhibits a desired mixture of the first signal and the second signal; and S5 providing an output signal.

For further preferential embodiments and corresponding advantages, reference is made to the above remarks relative to the radar target emulator so as to avoid repetition.

According to one implementation of the method according to the present invention, a third signal is additionally applied in S1 to a third attenuation device, the third signal additionally being modified by the third attenuation device in S2, in particular to a differing degree of attenuation than the degree of attenuation of the first and/or second attenuation device, wherein the degree of attenuation of the third attenuation device can be modified, in particular dynamically and/or incrementally, in particular at least substantially continuously. A third attenuated signal is additionally provided in S3 and the first attenuated signal, the second attenuated signal and the third attenuated signal are added in S4 such that the output signal exhibits a desired mixture of the first signal, the second signal and the third signal. For further preferential embodiments and corresponding advantages, reference is made to the above remarks relative to the radar target emulator so as to avoid repetition.

According to a further implementation pursuant to the present invention, the degree of attenuation of the first attenuation device and/or the degree of attenuation of the second attenuation device, in particular and/or the degree of attenuation of the third attenuation device, is set and/or varied between a lower extreme value and an upper extreme value, in particular wherein the upper extreme value of an attenuation corresponds at least substantially to 100% and/or the lower extreme value of an attenuation corresponds at least substantially to 0%. For further preferential embodiments and corresponding advantages, reference is made to the above remarks relative to the radar target emulator so as to avoid repetition.

According to one implementation of the method pursuant to the present invention, the method further comprises the steps:

S2a increasing the degree of attenuation of the first attenuation device while at least substantially simultaneously decreasing the degree of attenuation of the second attenuation device, and the degree of attenuation of the third attenuation device at least substantially corresponds, in particular consistently, to the upper extreme value, in particular 100%;

S2b upon the degree of attenuation of the first attenuation device at least substantially reaching the upper extreme value, in particular at least substantially 100%, and the degree of attenuation of the second attenuation device at least substantially reaching the lower extreme value, in particular at least substantially 0%: increasing the degree of attenuation of the second attenuation device while at least substantially simultaneously decreasing the degree of attenuation of the third attenuation device, and the degree of attenuation of the first attenuation device at least substantially corresponding, in particular consistently, to the upper extreme value, in particular 100%; and applying a fourth signal to the first attenuation device.

This is particularly advantageous as it thereby allows for realizing the desired emulating of an object distance with reduced, in particular at least substantially prevented, phase jumps, particularly at least substantially without phase jumps. The superimposing between the first and second signal is described in step S2a whereas step 2b describes how the object distance to be emulated can be further modified when the distance at least substantially corresponds to the distance emulated by the second signal and therefore needs to be "switched" to another distance range in which the distance can then again be set at least substantially continuously. This is of particular advantage since also an object approaching from a greater distance or respectively moving away from the vehicle can be advantageously emulated.

According to a further implementation of the method pursuant to the present invention, additionally in step S2b a fourth signal is applied to the first attenuation device; and S2c upon the degree of attenuation of the second attenuation device at least substantially reaching the upper extreme value, in particular at least substantially 100%, and the degree of attenuation of the third attenuation device at least substantially reaching the lower extreme value, in particular at least substantially 0%:

the degree of attenuation of the third attenuation device is increased while the degree of attenuation of the first attenuation device is at least substantially simultaneously decreased, and the degree of attenuation of the second attenuation device at least substantially corresponds, in particular consistently, to the upper extreme value, in particular 100%.

This is particularly advantageous since superimposition can in this way be made on a more distant distance range, in particular at least substantially without a phase jump in the output signal, since the fourth signal is applied to an input with its attenuation device being at least substantially in the range of the upper extreme value of 100%, which results in the phase jump occurring during switching being at least substantially not included in the output signal. In other words: The signal needed to emulate the next required distance range is applied to the respectively inactive input of the superimposition apparatus. The respective input is therefore to be regarded as being inactive since the superimposition occurs at the respective point in time between the other two attenuation devices and the degree of attenuation of the inactive input amounts at least substantially to 100% such that as already explained above a change in the respectively applied signal has at least substantially no impact on the output signal of the superimposition apparatus.

The invention will be described in greater detail below on the basis of non-limiting exemplary embodiments as depicted in the figures. Shown therein schematically at least to some extent.

Figure 2:
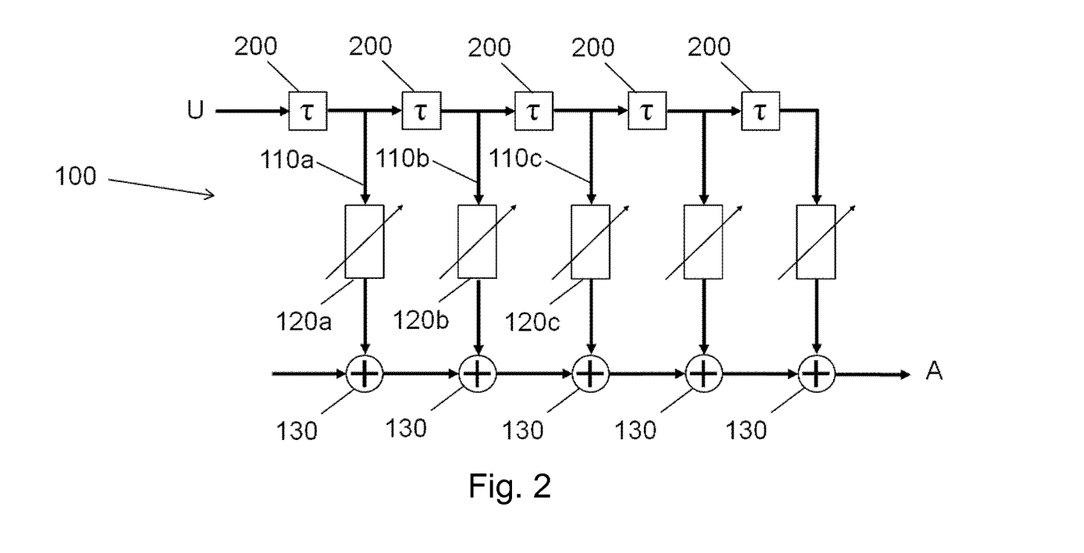
FIG. 2 a circuit diagram of the basic concept of a superimposition apparatus according to one implementation of the present invention.

FIG. 2 shows a highly schematized circuit diagram of the basic concept of a superimposition apparatus 100 according to one implementation of the present invention. The superimposition apparatus 100 comprises five attenuation devices 120a, 120b, 120c according to the embodiment of FIG. 2 as well as a plurality of addition devices 130, here in particular five. A source signal ∪ is fed to a series-connected chain of time delay mechanisms 200.

Each time delay mechanism 200 comprises a time delay device, a directional coupler device and, if necessary, an amplifier device. The source signal is delayed by means of the time delay device. As already described above, a distance of an object to be modulated is imaged to the test sensor by means of this delay. The thus delayed signal is branched via the directional coupler device, whereby a branch signal is amplified if needed via the amplifier device and supplied as input signal to the first attenuation device 120a. In the present case of FIG. 2, five time delay mechanisms 200 of the type just described are connected in series, wherein in each case a time delay mechanism 200 downstream an input signal has an output signal of the upstream time delay mechanism 200, in particular a time delay mechanism 200 downstream an input signal is formed by an output signal of the upstream time delay mechanism 200. A total of five input signals are provided for the respective attenuation devices 120a, 120b, 120c by this series connection, each respectively differing in their delay. It should be noted that the time delay provided by the depicted time delay mechanisms is not necessarily identical; in fact, it is advantageous in one implementation for different time delays to be provided for the respective time delay mechanisms 200, for example in order to depict distances to the sensor of 1, 2, 4 and 8 m or the like.

According to one implementation, the source signal U is a signal which is emitted by an actual radar sensor of a test sensor, received by a receiver device upstream thereof, and fed in the signal direction to the first time delay mechanism 200. In so doing, it is possible in particularly advantageous way to only use one single delay line able to provide differently delayed signals for the emulation of the objects to be imaged.

The (input) signals of the attenuation devices 120a, 120b, 120c are attenuated to a predetermined extent and provided as an attenuated signal. In accordance with the implementation of FIG. 2, each of the attenuation devices 120a, 120b, 120c is allocated an addition device 130 which is configured to relay the attenuated signal as a component of an output signal A.

Figure 3:
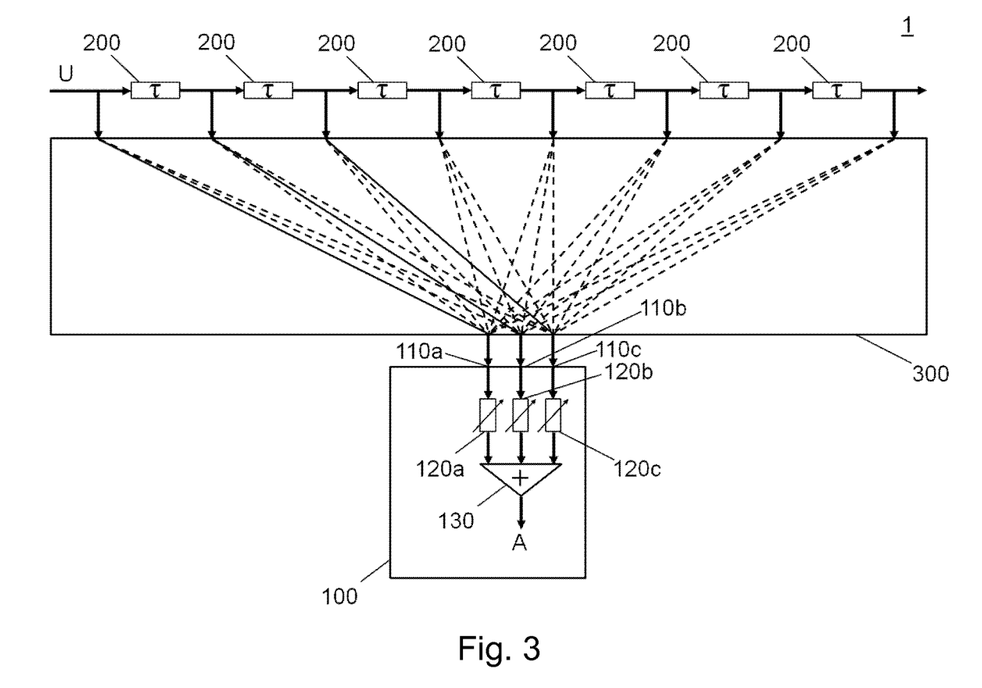
FIG. 3 a circuit diagram of a radar target emulator having a superimposition apparatus according to one implementation of the present invention.

FIG. 3 shows a circuit diagram of a radar target emulator 1 with a superimposition apparatus 100 according to one implementation of the present invention. The superimposition apparatus 100 of FIG. 3 differs at least substantially from that of FIG. 2 by the fact of only three attenuation devices 120a, 120b, 120c being provided. As already explained above, three attenuation devices are sufficient according to one implementation of the present invention since the output signal A according to one implementation of the present invention is always set by means of two attenuation devices 120a, 120b, 120c while the remaining attenuation device has a degree of attenuation of at least substantially 100% and is thus switched to passive. A signal is applied to this remaining attenuation device which is necessary for defining the next required distance range over time. After the distance range is changed, one of the two other attenuation devices 120a, 120b, 120c is switched to a passive state. In this phase, while the relevant attenuation device is switched to passive, that signal which is necessary for providing the subsequent distance range can already be applied to the appropriate input in preparation of the next change in range.

As FIG. 3 shows, the number of inputs 110a, 110b, 110c of the superimposition apparatus 100 is thereby reduced to three. This reduces the structural complexity of the superimposition apparatus 100. However, in order to connect a plurality of time delay mechanisms 200 (here seven) to the inputs in signal-carrying fashion, as shown in FIG. 3, a switching apparatus 300 is provided.

In the present case, the switching apparatus 300 comprises 24 switching configurations (not shown) which are interconnected in the form of a matrix having eight columns and three rows. According to one implementation of the present invention, the columns of the matrix thus correspond to different distances of objects to be imaged, wherein a separate row is provided for each of the three inputs 110a, 110b, 110c.

According to one implementation of the present invention, a switching configuration of the switching apparatus 300 comprises a directional coupler device, a switching device and an addition device. A signal supplied by one of the time delay mechanisms is branched by the directional coupler device into a first output signal and a branch signal supplied to the switching device. The switching device is configured to switch back and forth between at least two switching states thereto, a first switching state and a second switching state, whereby the branch signal is supplied to the addition device 100 in the first switching state and not relayed in the second switching state. The addition device combines a second signal and the branch signal into a second output signal. According to one implementation, it is not absolutely imperative for a second input signal to be applied to in particular the foremost switching apparatus column in the signal direction so as to ensure the correct interconnection. In this case, the second output signal is at least substantially formed exclusively by the branch signal. The matrix structure as just described enables any given signal of the time delay mechanisms to be relayed to at least one of the attenuation devices 120a, 120b, 120c.

Figure 4:
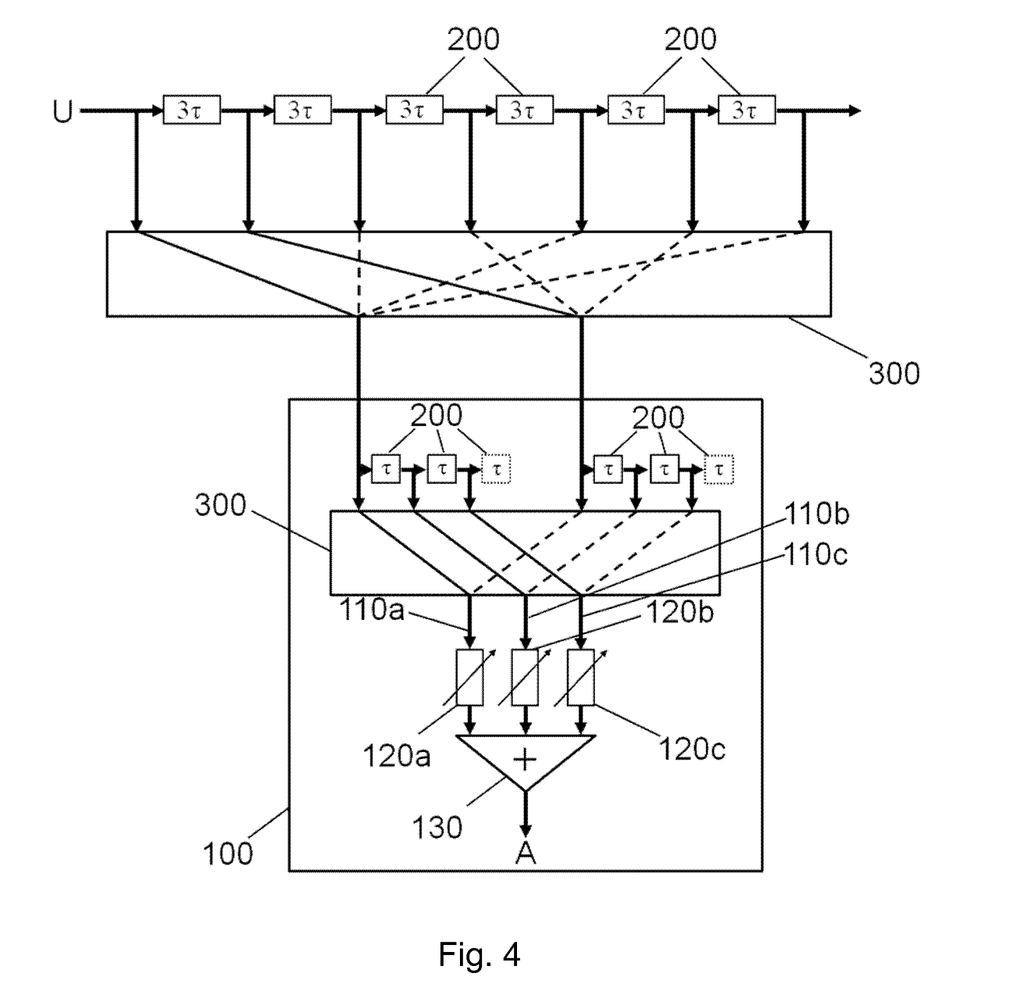
FIG. 4 a circuit diagram of a radar target emulator having a superimposition apparatus according to a further implementation of the present invention.

FIG. 4 shows a circuit diagram of a radar target emulator 1 having a superimposition apparatus 100 according to a further implementation of the present invention. In contrast to the radar target emulator 1 according to FIG. 3, the radar target emulator 1 according to FIG. 4 shows six series-connected time delay mechanisms 200 which each generate a time delay of 3 τ. Just as with the source signal, the thus produced first input signals go into a switching apparatus 300 of the type described above, whereby, however, structured in the form of a matrix having seven columns and two rows. Each of the two thus generated second output signals is passed into a further block of three series-connected time delay mechanisms 200 and respectively realize a time delay of τ, as well as a further switching configuration 300 in the form of a matrix with six columns and three rows, before a signal, further delayed if applicable, is fed to one of the attenuation devices 120a, 120b, 120c.

This hierarchical structure of switching apparatus and time delay mechanisms enables further resolving the second output signal respectively selectable at 3 τ in terms of the delay to 1 τ. This additionally increases the imaging accuracy of the radar target emulator 1, whereby this approach enables keeping the complexity of the first series connection of time delay mechanisms 200 low while at least maintaining, in particular improving, the resolution and scalability for output signal A.

LIST OF REFERENCE NUMERALS 1 radar target emulator
100 superimposition apparatus
110a (first) input
110b (second) input
110c (third) input
120a (first) attenuation device
120b (second) attenuation device
120c (third) attenuation device
130 addition device
U source signal

What is claimed is:

1. A radar target emulator having a superimposition apparatus, wherein the superimposition apparatus comprises:
   a first input provided to receive a first signal;
   a second input provided to receive a second signal;
   a first attenuation device connected to the first input in a signal-carrying fashion and configured to attenuate the first signal and provide a first attenuated signal;

a second attenuation device connected to the second input in a signal-carrying fashion and configured to attenuate the second signal and provide a second attenuated signal; and an addition device configured to add the first attenuated signal and the second attenuated signal and output a corresponding output signal, wherein the first signal and the second signal stem from a common source signal, wherein the common source signal is delayed via a time delay device and branched via a directional coupler device into the first signal and the second signal in such a manner that the time delays of the first signal and the second signal are different from each other, wherein the first attenuation device and the second attenuation device can be controlled in such a way that the output signal from the addition device has a time delay anywhere in between the time delays of the first signal and the second signal, and wherein the common source signal is received by a receiver device and fed to the time delay device.

2. The radar target emulator according to claim 1, wherein the first and the second attenuation devices are at least substantially independently adjustable.

3. The radar target emulator according to claim 1, wherein at least one of the first attenuation device and the second attenuation device is a substantially continuous and/or dynamically adjustable attenuation device.

4. The radar target emulator according to claim 1, further comprising:
a third input provided to receive a third signal;
a third attenuation device connected to the third input in signal-carrying fashion and configured to attenuate the third signal and provide a third attenuated signal;
wherein the addition device is configured to add the first attenuated signal, the second attenuated signal, and the third attenuated signal and output a corresponding output signal.

5. The radar target emulator according to claim 4, wherein the first signal, the second signal, and the third signal stem from a common source signal and differ from each other in terms of at least one property.

6. The radar target emulator according to claim 4, wherein at least one of the degree of attenuation of the first attenuation device, the degree of attenuation of the second attenuation device, and the degree of attenuation of the third attenuation device is set and/or varied between a lower extreme value and an upper extreme value.

7. The radar target emulator according to claim 1, wherein the common source signal is a signal generated by a sensor of a vehicle.

8. The radar target emulator according to claim 5, wherein the second signal is received by a second time delay device, wherein the second signal is branched via a second directional coupler device into the third signal.

9. A method for superimposing signals, comprising the steps:
S1 applying a first signal to a first attenuation device and a second signal to a second attenuation device;
S2 attenuating the first signal and the second signal to different degrees of attenuation by means of the first and second attenuation devices;
S3 providing a first attenuated signal and a second attenuated signal;
S4 adding the first attenuated signal and the second attenuated signal; and
S5 providing an output signal, wherein the first signal and the second signal stem from a common source signal,
wherein the common source signal is delayed via a time delay device and branched via a directional coupler device into the first signal and the second signal in such a manner that the time delays of the first signal and the second signal are different from each other,
wherein the output signal has a time delay anywhere in between the time delays of the first signal and the second signal, and
wherein the common source signal is received by a receiver device and fed to the time delay device.

10. The method according to claim 9, wherein
in S1 a third signal is applied to a third attenuation device;
in S2 the third signal is modified by the third attenuation device to a differing degree of attenuation than a degree of attenuation of at least one of the first and second attenuation devices, wherein a degree of attenuation of the third attenuation device can be modified, dynamically or incrementally, at least substantially continuously;
in S3 a third attenuated signal is provided; and
in S4 the first attenuated signal, the second attenuated signal, and the third attenuated signal are added such that the output signal exhibits a desired mixture of the first signal, the second signal, and the third signal.

11. The method according to claim 10, wherein at least one of the degree of attenuation of the first attenuation device, the degree of attenuation of the second attenuation device, and the degree of attenuation of the third attenuation device, is set and/or varied between a lower extreme value and an upper extreme value.

12. The method according to claim 11, wherein the S2 attenuating step further comprises:
S2a the degree of attenuation of the first attenuation device is increased while the degree of attenuation of the second attenuation device is at least substantially simultaneously decreased, and the degree of attenuation of the third attenuation device at least substantially corresponds to the upper extreme value; and
S2b upon the degree of attenuation of the first attenuation device at least substantially reaching the upper extreme value, and the degree of attenuation of the second attenuation device at least substantially reaching the lower extreme value:
the degree of attenuation of the second attenuation device is increased while the degree of attenuation of the third attenuation device is at least substantially simultaneously decreased, and the degree of attenuation of the first attenuation device at least substantially corresponds to the upper extreme value; and
a fourth signal is applied to the first attenuation device.

13. The method according to claim 12, wherein the S2 attenuating step further comprises:
S2c upon the degree of attenuation of the second attenuation device at least substantially reaching the upper extreme value, and the degree of attenuation of the third attenuation device at least substantially reaching the lower extreme value:
the degree of attenuation of the third attenuation device is increased while the degree of attenuation of the first attenuation device is at least substantially simultaneously decreased, and the degree of attenuation of the second attenuation device at least substantially corresponds to the upper extreme value.

14. The method according to claim 9, wherein the common source signal is a signal generated by a sensor of a vehicle.

15. The method according to claim 10, wherein the second signal is received by a second time delay device, wherein the second signal is branched via a second directional coupler device into the third signal.

\* \* \* \* \*